United States Patent
Kerkman et al.

(10) Patent No.: US 8,086,420 B2
(45) Date of Patent: Dec. 27, 2011

(54) JUNCTION TEMPERATURE PREDICTION METHOD AND APPARATUS FOR USE IN A POWER CONVERSION MODULE

(75) Inventors: Russel J. Kerkman, Milwaukee, WI (US); Lixiang Wei, Whitefish Bay, WI (US); Richard A. Lukaszewski, New Berlin, WI (US); Brian P. Brown, Mayville, WI (US); Neil Gollhardt, Fox Point, WI (US); Bruce W. Weiss, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 374 days.

(21) Appl. No.: 12/033,940

(22) Filed: Feb. 20, 2008

(65) Prior Publication Data

US 2008/0140351 A1 Jun. 12, 2008

Related U.S. Application Data

(63) Continuation of application No. 11/238,005, filed on Sep. 28, 2005, now Pat. No. 7,356,441.

(51) Int. Cl.
*G06F 11/30* (2006.01)
(52) U.S. Cl. ....................................... 702/182
(58) Field of Classification Search .................... 702/182
See application file for complete search history.

(56) References Cited

U.S. PATENT DOCUMENTS

| | | | |
|---|---|---|---|
| 6,203,191 B1 * | 3/2001 | Mongan | 374/43 |
| 7,035,064 B2 * | 4/2006 | Schimanek et al. | 361/23 |
| 2005/0046387 A1 | 3/2005 | Aker et al. | |

OTHER PUBLICATIONS

Dewei, Xu et al., Power Loss and Junction Temperature Analysis of power semiconductor devices, Sep./Oct. 2002, vol. 38, 1426-1431.*
Steve Clemente, Transient Thermal Response of Power Semiconductors to Short Power Pulses, IEEE Transactions on Power Electronics, vol. 8, No. 4, Oct. 1993, pp. 337-342.
Chan-Su Yun et al, Thermal Component Model for Electrothermal Analysis of IGBT Module Systems, IEEE Transactions on Advanced Packaging, vol. 24, No. 3, Aug. 2001, pp. 401-406.
Allen R. Hefner Jr., et al, A Dynamic Electro-Thermal Model for the IGBT, IEEE Transactions on Industry Applications, vol. 30, No. 2, Mar./Apr. 1994, pp. 394-405.
Vladimir Blasko, et al, On Line Thermal Model and Thermal Management Strategy of a Three Phase Voltage Source Inverter, IEEE Industry Applications Society, Oct. 1999, pp. 1423-1431.
Zhaohui Lou, et al, A Thermal Model for Insulated Gate Bipolar Transistor Module, IEEE Transactions on Power Electronics, vol. 19, No. 4, Jul. 2004, pp. 902-907.

(Continued)

*Primary Examiner* — Aditya Bhat
(74) *Attorney, Agent, or Firm* — Quarles & Brady LLP; Alexander R. Kuszewski; John M. Miller

(57) ABSTRACT

A method and apparatus for predicting junction device temperature of at least a first switching device in a power conversion module that includes a plurality of switching devices, the method comprising the steps of, during switching activity, identifying at least one operating characteristic of the first switching device and solving an equation that uses the identified operating characteristic to predict the temperature of the first switching device where the equation solved is a function of the location of the first switching device with respect to the other switching devices in the plurality.

16 Claims, 3 Drawing Sheets

OTHER PUBLICATIONS

F. Profumo, et al, Analysis of the Electro-Thermal Behaviour of Multichip Power Modules, IEEE 1998.

Michael T. Zhang et al, Design and Analysis of Thermal Management for High-Power-Density Converters in Sealed Enclosures, IEEE 1997, pp. 405-412.

Oliver Schepp et al, A Versatile Electrothermal Model of an Integrated Full Bridge Device Taking Into Account Various Boundary Conditions, IEEE 1997, pp. 185-190.

Jody J. Nelson et al; Fast Thermal Profiling of Power Semiconductor Devices Using Fourier Techniques; APEC 2003 18th Annual IEEE Applied Power Electronics Conference & Exposition, Miami Beach FL; Feb. 9-13, 2003; pp. 1023-1028.

A. Lakhsasi et al; Partially Coupled Electro-Thermal Analysis for Accurate Prediction of Switching Devices; Electrical & Computer Engineering 2001, Canadian Conference May 13-16, 2001, Piscataway NY USA, IEEE vol. 1; pp. 375-380.

M.M.R. Ahmed et al; Predicting IGBT Junction Temperature Under Transient Conditions; Industrial Electronics, 2002, ISIE 2002 Proc. of the 2002 IEEE International Symposium on Jul. 8-11, 2002, Piscataway, NJ; vol. 3, pp. 874-877.

European Search Report, Application No. 06019883.5-2207/1770851.

Uwe Drofenik et al; Teaching Thermal Design of Power Electronic Systems with Web-Based Interactive Educational Software; IEEE 2003; pp. 1029-1036.

* cited by examiner

JUNCTION TEMPERATURE PREDICTION METHOD AND APPARATUS FOR USE IN A POWER CONVERSION MODULE

CROSS-REFERENCE TO RELATED APPLICATIONS

This is a continuation of U.S. patent application Ser. No. 11/238,005 which has the same title and was filed on Sep. 28, 2005 now U.S. Pat. No. 7,356,441.

STATEMENT REGARDING FEDERALLY SPONSORED RESEARCH OR DEVELOPMENT

Not applicable.

BACKGROUND OF THE INVENTION

The present invention relates to integrated gate bipolar transistor (IGBT) modules and more specifically to a method and apparatus for predicting the junction temperatures of IGBTs in an IGBT module operating at a low frequency or a DC condition.

Because of their advantageous operating characteristics (e.g., high switching speeds) IGBTs are used in many different types of power conditioning modules including AC to DC converters, DC to AC inverters, AC-DC-AC converters, etc. For example, in the case of a DC-AC inverter, six IGBTs are arranged to form an inverter bridge along with six diodes.

During switching operations IGBTs and diodes generate heat that has a magnitude related to the switching frequency as well as the amount of current passing through the devices. When IGBT or diode junction temperature exceeds a specific threshold temperature associated with a device type, the devices have been known to fail. In order to reduce failure rate, IGBTs and diodes used in power conditioning modules are typically mounted to heat dissipating devices such as air or liquid cooled heat sinks and are rated for specific current levels/switching frequencies.

It is not possible to measure the temperature of a diode or IGBT junction directly and therefore device junction temperature has to be estimated or predicted. To predict device junction temperature during switching operations, some industry members have identified the thermal impedance associated with each device type and have mounted a temperature sensor (e.g., a negative temperature coefficient sensor (NTC sensor)) to the device (e.g., to a device case as opposed to at the junction itself). Then, during device switching, the measured device temperature and thermal impedance are used to calculate the power losses of the device and hence to predict the IGBT junction temperature. Hereinafter, the method described above to predict junction temperature will be referred to as a conventional prediction method. This method works well in cases where switching devices (e.g., IGBTs, diodes) are thermally isolated from other switching devices (i.e., where devices are mounted on separate heat sinks or are separated by a substantial distance (e.g., three device width dimensions) from other devices on the same sink).

To reduce the space required by the switching devices and diodes as well as the number of heat sinking components, in many cases a single heat sink having a single mounting surface is provided where all of the IGBTs and diodes that comprise a conditioning circuit are mounted to the single mounting surface. Unfortunately, when devices are mounted in close formations on a single heat sink, the conventional prediction method described above has been shown to be inaccurate. In the case of tightly packed devices on a single sink, because one device is extremely close to other devices on the sink, heat form one device tends to heat up adjacent devices. While heat from one device tends to increase the temperature of adjacent devices under all operating conditions, the neighbor heating effect is exacerbated at low switching frequencies and when a conditioning circuit is operated under DC conditions. For instance, in at least some experiments it has been observed that under DC conditions in a six-pack IGBT inverter module, a maximum prediction error of nearly 30 degrees Celsius has occurred when using the conventional prediction method.

In order to avoid device failure due to the prediction error, one solution has been to rate conversion modules (e.g., inverter, converters, etc.) at lower current and switching frequency levels (i.e., are de-rated) than the separate switches used to configure the modules. While this solution substantially eliminates the failure problem, this solution is relatively expensive as circuits including larger and more costly switching devices are required for specific current levels and switching frequencies. In addition, because the switching devices are physically larger, the sinks for mounting the devices are larger and the overall space required to accommodate the conversion modules is increased.

BRIEF SUMMARY OF THE INVENTION

It has been recognized that the accuracy of a junction temperature prediction algorithm can be increased substantially by accounting for the effects of at least some inter-module switching device heating as well as the effects of other ambient heating characteristics. Thus, the present invention includes methods and apparatus that relatively accurately predict switching device junction temperature by accounting for at least a subset of heating characteristics of adjacent devices and at least a subset of module impedances.

At least some inventive embodiments include a method for predicting junction device temperature of at least a first switching device in a power conversion module that includes the first switching device and at least a second switching device, the method comprising the steps of identifying a cross thermal impedance value indicative of how the temperature of the second switching device effects the first switching device temperature and using the cross thermal impedance value to predict the temperature of the at least a first switching device.

In some cases the module includes, in addition to the first and second devices, a plurality of additional switching devices and wherein the method further includes the steps of identifying a cross thermal impedance for each of the plurality of additional devices indicative of how the temperature of the additional device effects the first switching device temperature and using all of the cross thermal impedance values to predict the temperature of the at least a first switching device.

In some embodiments the cross thermal impedance between the second and first devices is a first impedance value and the module includes, in addition to the first and second devices, at least a third switching device and wherein the method further includes the steps of identifying a second cross thermal impedance that is indicative of how the temperature of the third device effects the first device temperature where the first and second cross thermal impedance values are different.

In some cases the method further includes the step of identifying a self thermal impedance value associated with the first switching device, the step of using the cross thermal impedance including mathematically combining the self thermal impedance and the cross coupling impedance to predict the first switching device temperature.

In some embodiments the method further includes the steps of providing a temperature sensor at least proximate the module, identifying at least one coupling thermal impedance from the second switching device to the sensor and generating a temperature value via the sensor, the step of using the cross thermal impedance including the step of mathematically combining the cross coupling impedance, the at least one coupling thermal impedance to the sensor, the temperature value generated by the sensor and the self impedance of the first switching device to predict junction temperature of the first switching device. In some cases each of the switching devices are one of a diode and an IGBT.

Some embodiments include a method for predicting junction device temperature of at least a first switching device in a power conversion module that includes a plurality of switching devices, the method comprising the steps of during switching activity, identifying at least one operating characteristic of the first switching device and solving an equation that uses the identified operating characteristic to predict the temperature of the first switching device where the equation solved is a function of the location of the first switching device with respect to the other switching devices in the plurality. In some cases the operating characteristic is the power loss of the first switching device.

In some cases the equation accounts for power losses of switching devices adjacent the first switching device as well as cross thermal impedance between the adjacent devices and the first switching device and wherein the method further includes the steps of identifying a cross thermal impedance between a switching device adjacent the first switching device and the first switching device and, during switching activity, identifying the power losses of switching devices adjacent the first switching device.

In some cases the switching devices adjacent the first switching device are neighboring devices and wherein the equation accounts for power losses of switching devices adjacent the neighboring devices as well as cross thermal impedance between the devices adjacent the neighboring devices and wherein the method further includes the steps of identifying a cross thermal impedance between a switching device adjacent a neighboring switching device and the first switching device and, during switching activity, identifying the power losses of switching devices adjacent the first switching device.

Some embodiments include a method for predicting junction device temperatures of at least a subset of devices in a power conversion module that includes a heat sink that forms a mounting surface, six IGBT devices and six diode devices that are mounted to the mounting surface, the method comprising the steps of identifying cross thermal impedance values indicative of the effect that temperature of adjacent devices have on each other, during switching activity, identifying power losses of at least a subset of the devices and using the device power loss values and the cross thermal impedance values to predict the temperatures of at least a subset of the module devices.

In some cases the step of identifying power losses includes identifying power losses of each of the module devices and wherein the step of using the power loss values and the cross thermal impedance values includes using the values to predict the temperatures of each of the module devices.

In some embodiments the method further includes the steps of providing a temperature sensor at least proximate the module and sensing the temperature of the module via the sensor, the step of using the values to predict the temperatures of at least a subset of the module devices including also using the sensed temperature value.

In some cases the method further includes the step of identifying thermal coupling impedances between the sensor and at least a subset of the devices, the step of using the values to predict the temperatures of at least a subset of the module devices also including using the thermal coupling impedances.

In some cases the method further includes the step of identifying a self impedance value for each of the module devices and, during switching activity, identifying power losses for each of the devices, the step of using the values to predict the temperatures also including using the self impedance values and the power losses of each of the devices.

In addition, some embodiments include an apparatus for use with a module that includes a plurality of electronic switching devices, the apparatus for predicting the junction temperature of at least a first of the switching devices, the apparatus comprising a processor that runs a program to perform the steps of identifying power loss of at least a second of the switching devices using the power loss value of the at least a second switching device to predict the temperature of the first switching device junction.

In some cases the apparatus further includes a database in which is stored a cross thermal impedance value indicative of the thermal impedance between the first and second devices, the processor using the power loss value and the cross thermal impedance to predict the temperature of the first switching device junction.

In some cases the database includes cross thermal impedance values for a sub-set of the devices in addition to the second device that are indicative of the thermal impedance between each of the other devices and the first device, the processor further identifying power loss values for each of the sub-set of devices and using all of the power loss values and the cross thermal impedance values to predict the temperature of the first switching device junction.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

Development of the Temperature Predicting Model

Figure 1:
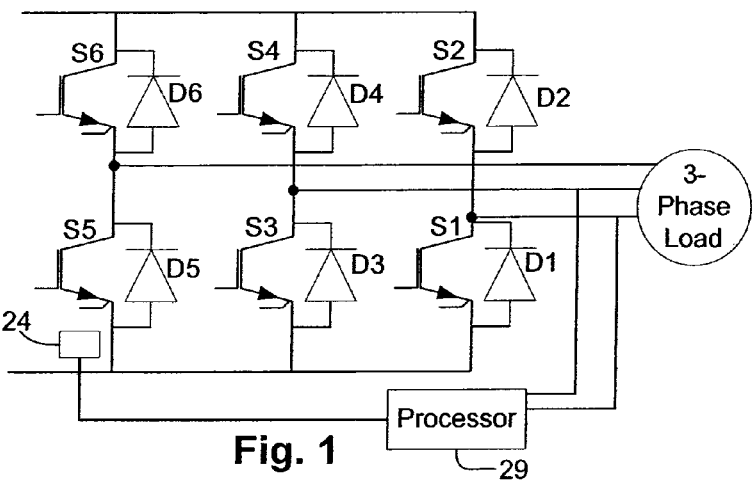
FIG. 1 is a schematic view of a three phase inverter.

Referring now to the drawings wherein like reference numerals correspond to similar elements throughout the several views and more specifically, referring to FIG. 1, the present invention will be described in the context of an exemplary three phase DC to AC inverter type power conditioning module 10. Module 10 includes six IGBT switch devices S1-S6 and six diodes (also generally referred to as switching devices) D1-D6, a separate diode linked to each of the IGBTs in inverse parallel relationship. The IGBT switches are linked in series pairs across positive and negative DC buses and a central node of each pair is linked to a separate phase of a three phase load 12 (e.g., motor). As known in the power conversion art, by switching the IGBTs, three phase voltage delivered to load 12 can be controlled.

Referring still to FIG. 1, current sensors 23 are linked to the motor supply lines for, as the label implies, sensing line currents. An NTC temperature sensor 24 is mounted proximate at least one of the switching devices for measuring a temperature proximate the devices. A processor 29 receives signals from the current sensor and NTC sensor 24 and uses the received signals to predict temperatures of the inverter devices.

Figure 2:
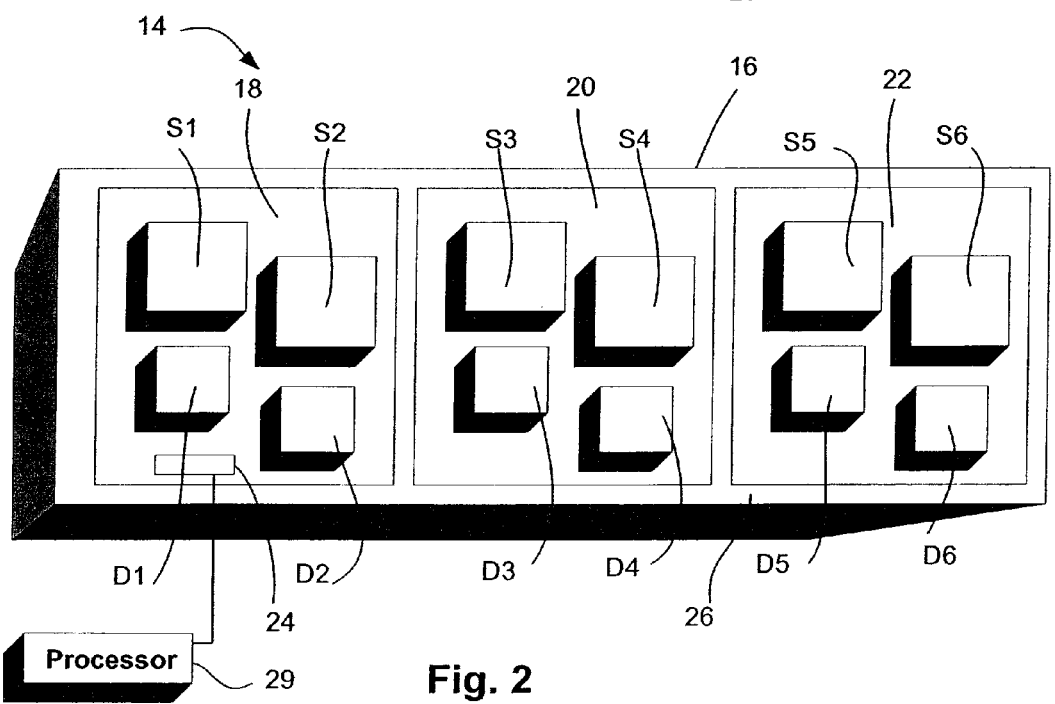
FIG. 2 is a perspective view of inverter IGBTs and diodes mounted to a mechanical heat sink.

Referring to FIG. 2, a perspective view of a six-pack inverter module 14 is illustrated which includes a mechanical heat sink 16, three mounting substrates 18, 20 and 22, IGBTs S1-S6, diodes D1-D6 and the NTC temperature sensor 24. The sink includes a flat mounting surface 26. IGBT pairs and associated diodes are each mounted via a separate one of the substrates to the mounting surface 26. For example, IGBTs S1 and S2 and associated diodes D1 and D2 are mounted to surface 26 with substrate 18 between the devices S1, S2, D1 and D2 and the sink mounting surface 26, devices S3, S4, D3 and D4 are mounted to surface 26 with substrate 20 between the devices and surface 26, and so on. As illustrated, substrates 18, 20 and 22 are arranged in a single row so that substrate 20 is between substrates 18 and 22. NTC sensor 24 is located inside a corner of module 14. Although not illustrated, one or more fan modules may be provided adjacent the rear sink surface that forms fins to facilitate sink cooling activity.

In order to accurately predict the temperature of each module device, the effects of various heat sources on device temperature have to be accounted for. The following discussion develops equations for taking into account all of the heat sources that affect device temperature during switching activity.

Figure 3:
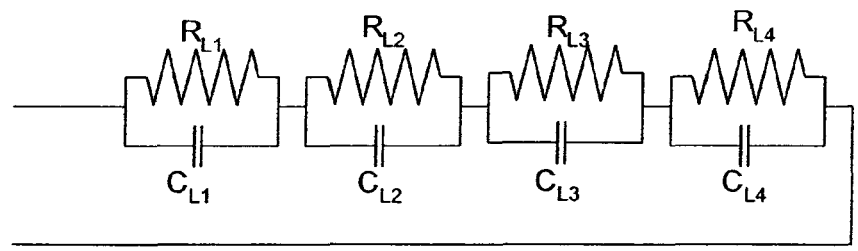
FIG. 3 is a schematic diagram illustrating an equivalent circuit of the thermal impedance between a device junction and a case layer for which manufacturers typically provide values.

The thermal impedance between a device junction and a device case for each IGBT or diode can be physically represented by four parallel RC sub-circuits which, unless indicated otherwise, will be referred to as "layers" hereinafter. The four layers can be arranged in series as illustrated in FIG. 3 to transform the physical representation to a mathematical representation. Note that after the transformation as shown in FIG. 3, the "layers" of the sub-circuit become meaningless. In FIG. 3, the thermal resistance and time constant values corresponding to the R and C components are typically provided by device manufacturers. Exemplary thermal resistances and time constants for each of the four layers are shown in table 1 that correspond to a EUPEC FS150R12KE3 power conversion module.

TABLE 1

| | Layers | | | |
|---|---|---|---|---|
| | 1 | 2 | 3 | 4 |
| $R_{dk}$ | 0.14283 | 0.17143 | 0.01931 | 0.00341 |
| $t_{dk}$ | 0.06499 | 0.02601 | 0.002364 | 1.187e−5 |
| $R_{ik}$ | 0.07559 | 0.09061 | 0.01039 | 0.00341 |
| $t_{ik}$ | 0.06499 | 0.02601 | 0.002364 | 1.187e−5 |

From FIG. 3, the following mathematical equations can be formulated to express the thermal impedance associated with a single device in a power conversion module:

$$ZI_{jc} = R_{i1}//C_{i1} + R_{i2}//C_{i2} + R_{i3}//C_{i3} + R_{i4}//C_{i4} \qquad \text{Eq. 1}$$

$$ZD_{jc} = R_{d1}//C_{d1} + R_{d2}//C_{d2} + R_{d3}//C_{d3} + R_{d4}//C_{d4} \qquad \text{Eq. 2}$$

where $ZI_{jc}$ and $ZD_{jc}$ are the junction to case thermal impedance of an IGBT device and a diode device respectively, $R_{ik}$ and $C_{ik}$ are the thermal resistance and capacitance of the $k_{th}$ layer of each IGBT device, respectively, and $R_{dk}$ and $C_{dk}$ are thermal resistance and capacitance of the $k_{th}$ layer of each diode device, respectively.

Figure 4:
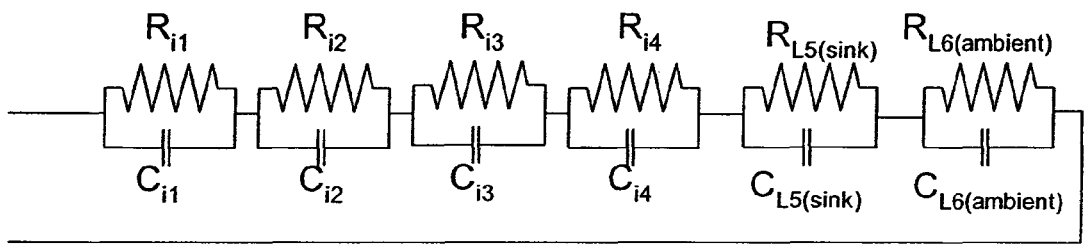
FIG. 4 is a schematic diagram similar to FIG. 3, albeit illustrating an equivalent circuit that includes additional components that account for self-impedance of devices.

Since the IGBT and diode devices are directly mounted on an air cooled heat-sink in the present example, the temperature increase of the case should be considered when predicting the temperature of each device. Referring to FIG. 4, it has been recognized through experiment that the thermal impedance between the interface plane of the case and the ambient can be physically approximated by two additional R-C sub-circuits or layers. A sink layer RC sub-circuit including $R_{L5}$ and $C_{L5}$ represents a temperature increase in thermal grease associated with the device to sink interface planes and the aluminum of the heat sink. An ambient layer RC sub-circuit including $R_{L6}$ and $C_{L6}$ represents the temperature increase between the interface plane of the heat sink and the plane of the ambient (i.e., between the sink and the air beneath the sink. Thus, a more complete self thermal impedance of the IGBT and diode devices mounted on a sink can be mathematically represented by the circuit shown in FIG. 4 and the self impedance $ZII_{ij}$ between the $i_{th}$ IGBT from the junction to the ambient and the self thermal impedance $ZDD_{ii}$ of the $i_{th}$ diode from the junction to the ambient can be expressed by the two following equations:

$$ZII_{ii} = ZI_{jc} + ZII_{5ii} + ZII_{6ii} \qquad \text{Eq. 3}$$

$$ZDD_{ii} = ZD_{jc} + ZDD_{5ii} + ZDD_{6ii} \qquad \text{Eq. 4}$$

where $ZI_{jc}$ and $ZD_{jc}$ are the thermal impedances between the junction and case layer for each IGBT and diode individually (see Equations 1 and 2 above), $ZII_{5ii}$ and $ZDD_{5ii}$ are the thermal impedances of the sink layer for the $i_{th}$ IGBT and $i_{th}$ diode, respectively, and $ZII_{6ii}$ and $ZDD_{6ii}$ are the impedances of the ambient layer (i.e., the subscripts "5" and "6" correspond to the 5th and 6th RC layers in FIG. 4).

Figure 5:
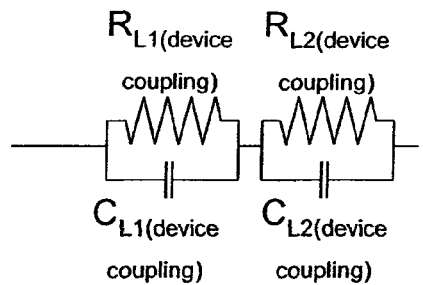
FIG. 5 is similar to FIG. 3, albeit illustrating an equivalent circuit representing coupling thermal impedance from a neighbor device.

The IGBT and diode devices in a power conversion module are mounted to the sink in very close proximity to each other and therefore thermal coupling between devices must be considered to accurately predict device temperature. Through experimentation it has been recognized that the coupling thermal impedance between IGBT and diode devices on a sink can be physically approximated by two additional layers represented by parallel RC sub-circuits. One is the sink layer which represents the temperature increase from case to sink across the thermal grease and from grease to ambient across the heat sink. The other is the ambient layer that represents the temperature increase of the air beneath the heat sink. Thus, the coupling thermal impedance between an IGBT or diode device and a neighboring device can be mathematically represented as illustrated in FIG. 5 including series RC sub-circuits including $R_{L1}$ and $C_{L1}$ and $R_{L2}$ and $C_{L2}$. The coupling $ZII_{ij}$ impedance from the $i_{th}$ IGBT to the $j_{th}$ IGBT and the impedance $ZID_{ij}$ from the $i_{th}$ IGBT to the $j_{th}$ diode device can be expressed by the following equations:

$$ZII_{ij}=ZII_{5ij}+ZII_{6ij} \qquad \text{Eq. 5}$$

$$ZID_{ij}=ZID_{5ij}+ZID_{6ij} \qquad \text{Eq. 6}$$

where, $ZII_{5ij}$ and $ZID_{5ij}$ are the coupling thermal impedances from the $i_{th}$ IGBT to the $j_{th}$ IGBT and the $j_{th}$ diodes at the sink layer, respectively, and $ZII_{6ij}$ and $ZID_{6ij}$ are the coupling thermal impedances from the $i_{th}$ IGBT to the $j_{th}$ IGBT and the $j_{th}$ diodes at the ambient layer, respectively. Generally, the coupling thermal impedance between two chips decreases when their distance increases.

Similarly, the coupling thermal impedance from the $i_{th}$ diode to the other module devices can also be expressed by the following equations $$ZDI_{ij}=ZDI_{5ij}+ZDI_{6ij} \qquad \text{Eq. 7}$$

$$ZDD_{ij}=ZID_{5ij}+ZID_{6ij} \qquad \text{Eq. 8}$$

where, $ZDI_{ij}$ and $ZDD_{ij}$ are the coupling thermal impedances from the $i_{th}$ diode to the $j_{th}$ IGBT and $j_{th}$ diode, respectively, $ZDI5_{ij}$ and $ZDD5_{ij}$ are the coupling thermal impedances from the $j_{th}$ diode to the $j_{th}$ IGBT and $j_{th}$ diodes at the sink layer, respectively, and, $ZDI6_{ij}$ and $ZDD6_{ij}$ are the coupling thermal impedances from the $i_{th}$ IGBT to the $j_{th}$ IGBT and the $j_{th}$ diodes at the ambient layer, respectively.

When multiple IGBTs and diodes are operated on a single module, the total temperature increase of one device between its junction to ambient that is attributable to the other devices is the sum of the contributions from all module IGBTs and diodes as shown in the following equations:

$$TI_k = \sum_{i=1}^{6} ZII_{5ki} \cdot PI_i + \sum_{i=1}^{6} ZDI_{6ki} \cdot PD_i + T_{amb} \qquad \text{Eq. 9}$$

$$TD_k = \sum_{i=1}^{6} ZID_{5ki} \cdot PI_i + \sum_{i=1}^{6} ZDD_{6ki} \cdot PD_i + T_{amb} \qquad \text{Eq. 10}$$

where, $TI_k$ is the junction temperature of the $k_{th}$ IGBT, $TD_k$ is the junction temperature of the $k_{th}$ diode, $PI_k$ is the power loss of the $k_{th}$ IGBT, $PD_k$ is the power loss of the $k_{th}$ diode and $T_{amb}$ is the ambient temperature.

Figure 6:
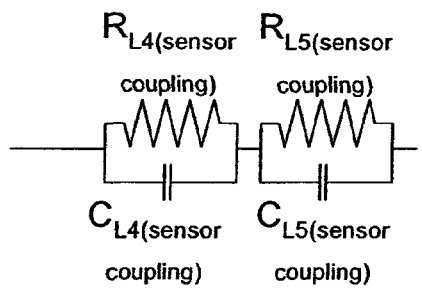
FIG. 6 is similar to FIG. 3, albeit illustrating an equivalent circuit representing coupling thermal impedance from an inverter device to a NTC temperature sensor.

The IGBT and diode temperatures are generally predicted using a temperature value identified by the NTC sensor 24 (see FIG. 2). Unfortunately, as illustrated in FIG. 2, the NTC sensor is separated from the device junctions and thus thermal impedance exists between the junctions and the NTC sensor such that the sensor generated value does not accurately reflect the junction temperature. For this reason, the influence of the thermal impedance between the device junctions and the NTC sensor should be accounted to accurately predict junction temperature. Using a method similar to the method described above, the NTC temperature can be predicted by knowing device losses and the distance of the devices to the NTC sensor. A two layer RC circuit that represents the coupling thermal impedance from the IGBT and diode devices mounted on a sink to the NTC sensor is shown in FIG. 6 where the sink and ambient layer impedances are represented by series RC sub-circuits including $R_{L3}$ and $C_{L3}$ as well as $R_{L4}$ and $C_{L4}$. The coupling thermal impedances $ZIN_i$ and $ZDN_i$ of the $i_{th}$ IGBT and the $i_{th}$ diode to the NTC sensor, respectively, can be expressed by the following two equations:

$$ZIN_i=ZIN_{5i}+ZIN_{6i} \qquad \text{Eq. 11}$$

$$ZDN_i=ZDN_{5i}+ZDN_{6i} \qquad \text{Eq. 12}$$

where $ZIN_{5i}$ and $ZIN_{6i}$ are the coupling thermal impedance from the $i_{th}$ IGBT to the NTC sensor at sink and ambient layers and $ZDN_{5i}$ and $ZDN_{6i}$ are the coupling thermal impedance from the $i_{th}$ diode to the NTC sensor at sink layers and ambient layers, respectively.

The total temperature increase $T_{ntc}$ of an NTC can be expressed as.

$$T_{ntc} = \sum_{i=1}^{6} ZIN_{5i} \cdot PI_i + \sum_{i=1}^{6} ZIN_{6i} \cdot PD_i + T_{amb} \qquad \text{Eq. 13}$$

Combining Equations 3 through 13, the following equations can be formulated for directly calculating IGBT and diode temperature estimates using a thermal impedance matrix and known device power losses:

$$TI=ZII \cdot PI+ZDI \cdot PD+Tamb \qquad \text{Eq. 14}$$

$$TD=ZDI \cdot PI+ZDD \cdot PD+Tamb \qquad \text{Eq. 15}$$

where:
$TI=[TI_1\ TI_2\ \ldots\ TI_6]^T$ is an IGBT temperature vector,
$TD=[TD_1\ TD_2\ \ldots\ TD_6]^T$ is a diode temperature vector,
$PI=[PI_1\ PI_2\ \ldots\ PI_6]^T$ is an IGBT power losses vector,
$PD=[PD_1\ PD_2\ \ldots\ PD_6]^T$ is a diode power losses vector, and
$T_{amb}=[T_{amb1}\ T_{amb2}\ \ldots\ T_{amb6}]^T$ is an ambient temperature vector.

In Equations 14 and 15, ZII, ZDI, ZID, and ZDD are each 6×6 matrices that represent the coupling thermal impedance matrix from the IGBTs to the IGBTs, from the IGBTs to the diodes, from the diodes to IGBTs and from the diodes to the diodes, respectively. The 6×6 matrices can be expressed in the following form:

$$ZII = \begin{bmatrix} ZII_{11} & ZII_{12} & \ldots & ZII_{16} \\ ZII_{21} & ZII_{22} & \ldots & ZII_{26} \\ \ldots & \ldots & \ldots & \ldots \\ ZII_{61} & ZII_{62} & \ldots & ZII_{66} \end{bmatrix}$$

$$ZDI = \begin{bmatrix} ZDI_{11} & ZDI_{12} & \ldots & ZDI_{16} \\ ZDI_{21} & ZDI_{22} & \ldots & ZDI_{26} \\ \ldots & \ldots & \ldots & \ldots \\ ZDI_{61} & ZDI_{62} & \ldots & ZDI_{66} \end{bmatrix}$$

$$ZID = \begin{bmatrix} ZID_{11} & ZID_{12} & \ldots & ZID_{16} \\ ZID_{21} & ZID_{22} & \ldots & ZID_{26} \\ \ldots & \ldots & \ldots & \ldots \\ ZID_{61} & ZID_{62} & \ldots & ZID_{66} \end{bmatrix}$$

-continued $$ZDD = \begin{bmatrix} ZDD_{11} & ZDD_{12} & \ldots & ZDD_{16} \\ ZDD_{21} & ZDD_{22} & \ldots & ZDD_{26} \\ \ldots & \ldots & \ldots & \ldots \\ ZDD_{61} & ZDD_{62} & \ldots & ZDD_{66} \end{bmatrix}$$

where $ZII_{ij}$, $ZDI_{ij}$, $ZID_{ij}$, and $ZDD_{ij}$ are the impedances discussed above.

It should be appreciated that Equations 14 and 15 are relatively complex and would be somewhat burdensome to solve using a standard drive micro-processor. For this reason, hereafter, several assumptions are made that enable simplification of Equations 14 and 15. To this end, based on the locations of the IGBTs and diodes as shown in FIG. 2, several assumptions and approximations can be made to simplify the equations. First, the coupling impedance and the self thermal impedance in the ambient layers are equal such that:

$$ZII_{6ij}=ZDI_{6ij}=ZID_{6ij}=ZDD_{6ij}=ZIN_{6i}=ZDN_{6i}=Z_{amb} \quad \text{Eq. 16}$$

Second, at the sink layer, the coupling impedances associated with neighboring or adjacent devices that are an identical or similar distance away from one device should be approximately equal or at least similar enough that the differences between these coupling impedances are trivial and can be neglected such that:

$$ZII_{5ij}|_{i-j|=1}=ZDD_{5ij}|_{i-j|=1}=ZID_{5ij}|_{i-j|=1}=ZDI|_{i-j|=1}=Z_1 \quad \text{Eq. 17}$$

$$ZII_{5ij}|_{i-j|=2}=ZDD_{5ij}|_{i-j|=2}=ZID_{5ij}|_{i-j|=2}=ZDI|_{i-j|=2}=Z_2 \quad \text{Eq. 18}$$

where $Z_1$ corresponds to devices that are one device away (i.e., that are adjacent) from a specific device for which junction temperature is being predicted and $Z_2$ corresponds to devices that are two devices away from the specific device for which junction temperature is being predicted.

Third, at the sink layer, the coupling impedances between devices that are separated by relatively large distances can be neglected. For example, while adjacent devices and devices that are one or two device dimensions (i.e., one or two device widths) away from a first device may effect the temperature of the first device, devices that are three or more device dimensions away from the first device will only have a negligible effect on the temperature of the first device and thus the effect can be ignored without significantly effecting the final temperature prediction. Here, for instance, where the effects of devices that are more than two devices away from a device for which the junction temperature is being predicted are ignored, the relationships represented by the following equation will be substantially accurate:

$$ZII_{5ij}|_{i-j|>2}=ZDI_{5ij}|_{i-j|>2}=ZID_{5ij}|_{i-j|>2}=ZDD_{5ij}|_{i-j|>0} \, ZIN_{5i|i>2}=ZDN_{5i|i>2}=0 \quad \text{Eq. 19}$$

Combining Equations 14 and 16 through 19, the following IGBT temperature vector equation can be formed:

$$TI=[(ZI_0+Z_{jc})I_6+Z]PI+[ZDI_0 \cdot I_6+Z]PD+P \cdot Zamb \cdot A+Tamb \quad \text{Eq. 20}$$

where:
$I_6$ is the 6-by-6 identity matrix,
P is the total losses of all IGBTs and diodes,
$A=[1 \, 1 \, \ldots \, 1]^T$ is a 6-by-1 vector, and
Z is a coupling thermal impedance matrix that has the form:

$$Z = \begin{bmatrix} 0 & Z_1 & Z_2 & 0 & 0 & 0 \\ Z_1 & 0 & Z_1 & Z_2 & 0 & 0 \\ Z_2 & Z_1 & 0 & Z_1 & Z_2 & 0 \\ 0 & Z_2 & Z_1 & 0 & Z_1 & Z_2 \\ 0 & 0 & Z_2 & Z_1 & 0 & Z_1 \\ 0 & 0 & 0 & Z_2 & Z_1 & 0 \end{bmatrix}$$

Similarly, Equations 15 through 19 can be combined to yield the following diode temperature vector equation:

$$TD=[(ZD_0+ZD_{jc})I_6+Z]PI+[ZID_0I_6+Z]PD+PZamb \cdot A+Tamb \quad \text{Eq. 21}$$

Equations 13 and 16 through 19 can be combined to simplify the NTC temperature equation as follows:

$$T_{ntc} = \sum_{i=1}^{3} ZIN_{5i}PI_i + \sum_{i=1}^{3} ZDN_{5i}PD_i + PZamb \cdot A + T_{amb} \quad \text{Eq. 22}$$

Upon examining equations 20-22, it should be recognized that the thermal impedance in the ambient layer will be cancelled when predicting the IGBT and diode temperatures using the NTC sensor value. However, the coupling thermal impedance of the sink layer cannot be neglected.

Equations 20 and 22 can be combined to yield the following equation for predicting the IGBT junction temperatures from the NTC sensor temperature value and power losses:

$$TI - T_{ntc}A = [(ZI_0 + Z_{jc})I_6 + Z]PI + [ZDI_0 \cdot I_6 + Z]PD - \left( \sum_{i=1}^{3} ZIN_{5i}PI_i + \sum_{i=1}^{3} ZDN_{5i}PD_i \right) \cdot A \quad \text{Eq. 23}$$

Similarly, equations 20 and 21 can be combined to yield the following equation for predicting the diode junction temperatures from the NTC sensor temperature value and the power losses:

$$TD - T_{ntc}A = [(ZD_0 + ZD_{jc})I_6 + Z]PI + [ZID_0 I_6 + Z]PD - \left( \sum_{i=1}^{3} ZIN_{5i}PI_i + \sum_{i=1}^{3} ZDN_{5i}PD_i \right) \cdot A \quad \text{Eq. 24}$$

As seen in Equations 23 and 24, the ambient layer impedance and the ambient temperature from Equations 21 and 22 both cancel when Equations 23 and 24 are formulated.

The thermal impedances in Equation 23 and 24 can be directly calculated by applying pulsed current through each IGBT and each diode device on the module. For example, each IGBT and diode device may be injected with a 100 A, 250 second current pulse and the temperature of the device during the pulse can be directly measured and recorded. The corresponding thermal impedances can then be calculated by a curve fitting program (e.g., a program built up using Matlab which is owned by MathWorks, Inc., or some similar type of software).

Figure 7:
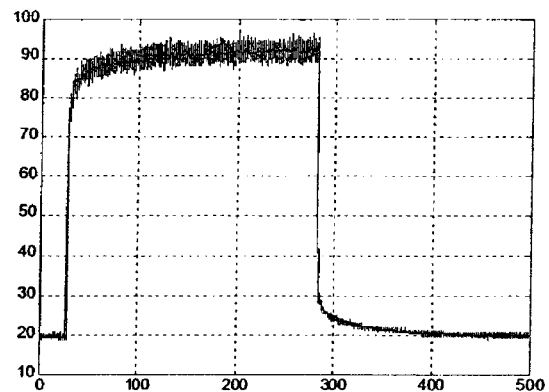
FIG. 7 is a graph illustrating experimental and curve fitted device temperatures for diode D3 in FIG. 2 when diode D3 is powered.
Figure 8:
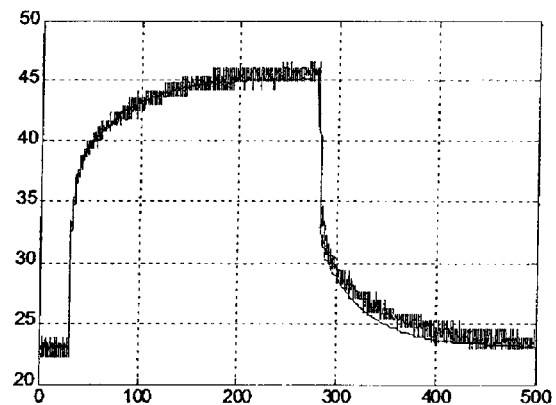
FIG. 8 is similar to FIG. 7, albeit illustrating curves corresponding to switch S4 in FIG. 2 when diode D4 is powered.
Figure 9:
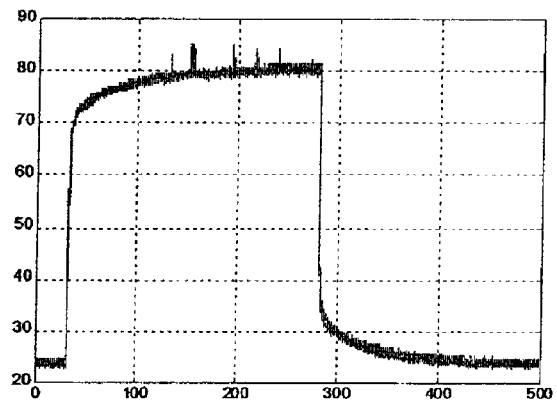
FIG. 9 is similar to FIG. 7, albeit illustrating curves corresponding to switch S3 when switch S4 is powered.

Referring again to FIG. 2 and also to FIG. 7, the data plotted in FIG. 7 shows the experimental result of the real temperature and the curve fitted temperature of third diode D3 when the third diode is powered. FIG. 8 shows the experimental result of the real temperature and the curve fitted temperature of fourth IGBT S4 when the fourth diode D4 is powered. In FIG. 8 it can be seen that the temperature of diode D4 clearly effects the temperature of adjacent IGBT S4. FIG. 9 shows the experimental result of the real temperature and the curve fitted temperature of third IGBT S3 when the fourth IGBT S4 is powered. In FIG. 9 it can be seen that the temperature of IGBT S4 clearly effects the temperature of adjacent IGBT S3.

In the curve fitting program used to generate the fitted curves in FIGS. 7 through 9, a two layer model was used to approximate the coupling and self thermal impedance of each device. Examining FIGS. 7 through 9 the effectiveness of the two layer thermal impedance model is clearly verified.

Exemplary coupling impedance values determined using the curve fitting software and Equations 23 and 24 are listed in tables 2, 3 and 4 with the thermal impedance values of the sink layer shown in Table 2, the coupling thermal impedance of the ambient layer shown in Table 3 and the coupling thermal impedance values from the IGBTs and diodes to the NTC sensor shown in table 4.

TABLE 2

|  | $ZI_0$ | $ZD_0$ | $ZDI_0$ | $Z_1$ | $Z_2$ |
|---|---|---|---|---|---|
| R(k/w) | 0.1308 | 0.15 | 0.0885 | 0.047 | 0.02 |
| t (s) | 1.5 | 2.2 | 1.5 | 1.5 | 2 |

TABLE 3

|  |  |  | Distance |  |  |  |
|---|---|---|---|---|---|---|
|  | $ZI_0$ | $ZD_0$ | $Z_1$ | $Z_2$ | $Z_3$ | $Z_4$ |
| R (k/w) | 0.055 | 0.055 | 0.055 | 0.05 | 0.036 | 0.032 |
| t (s) | 46 | 46 | 60 | 60 | 80 | 80 |

TABLE 4

|  | Sink Layer | | | | | |
|---|---|---|---|---|---|---|
|  | $ZDN_{S1}$ | $ZDN_{S2}$ | $ZDN_{S3}$ | $ZIN_{S1}$ | $ZIN_{S2}$ | $ZIN_{S3}$ |
| R (k/w) | 0.084 | 0.054 | 0.017 | 0.033 | 0.038 | 0.005 |
| t (s) | 1.45 | 2.17 | 10 | 3.54 | 3.85 | 2.00 |

Using tables 1, 2 and 3, the self thermal resistance of the IGBTs can be calculated by adding the four IGBT related resistances in Table 1 and the resistances associated with the $ZI_0$ sink and ambient layers in Tables 2 and 3 to, in the present example, yield the following value:

$$R_{II} = 0.3657 \, k/w \quad \text{Eq. 25}$$

Similarly, referring again to Tables 1, 2 and 3, the self thermal resistance of the diode devices can be calculated by adding the four diode related resistances in Table 1 and the resistances associated with the $ZD_0$ sink and ambient layers in Tables 2 and 3 to, in the present example, yield the following value:

$$R_{DD} = 0.545 \, k/w \quad \text{Eq. 26}$$

Comparing the values expressed in Equations 25 and 26 to the coupling thermal impedance values (e.g., $Z_1, Z_2, Z_3$, etc.) shown in tables 2 and 3, the following conclusions can be made. First, in the sink layer, the coupling thermal impedances $Z_1, Z_2$, between neighbor chips are much smaller than the self impedance and therefore impedance values $Z_1, Z_2$ can have at least some error without significantly effecting temperature prediction accuracy. Second, the coupling thermal impedance in the ambient layer (see Table 3) is trivial when compared to the self impedance and therefore a uniform thermal impedance can be assumed without significantly effecting temperature prediction accuracy. These assumptions are consistent with an understanding that Equations 23 and 24 above are relatively accurate.

Results

The temperature prediction Equations 23 and 24 have been used to predict the junction temperatures of module devices where the devices have been operated under DC conditions. During testing, four models were investigated and compared with each other so that the accuracy of Equations 23 and 24 could be ascertained.

The first model is called "$R_{jc}$ model" in which a uniform case temperature was assumed. In this case the NTC temperature is assumed to be equal to the case layer.

The second model is referred to as the "No neighbor" model because, as the label implies, the model did not account for the thermal coupling between neighboring or adjacent IGBTs and diodes. Thus, in this case, it was assumed that $Z_1$ and $Z_2$ each were equal to zero in the temperature prediction equations above (i.e., in equations 23 and 24 and the Z matrix as shown in Equation 20). However, in this second model, the thermal impedances of the devices themselves (e.g., $ZII_0$, $ZDD_0$) were considered.

The third model is referred to as the "one neighbor" model because the model includes equations that consider the coupling thermal impedance between the devices that are closest or immediately adjacent a specific device for which the junction temperature is being predicted. Here, the coupling thermal impedance is neglected when a device is separated from a device for which the temperature is being predicted by at least one other device. Thus, in the third model $Z_2$ was set equal to zero in Equations 20, 23 and 24.

The fourth model is referred to as the "two neighbor" model because the model includes equations that consider the coupling thermal impedance between devices immediately adjacent a device for which temperature is being predicted as well as devices that are adjacent the immediately adjacent devices (i.e., devices that are no more than two devices away from the device for which temperature is being predicted. Here, the coupling thermal impedance is neglected when a device is separated from a device for which the temperature is being predicted by at least two other device.

During testing, an inverter module akin to module 14 illustrated in FIG. 2 was operated under the following conditions:

| DC bus voltage: | 300 V |
|---|---|
| Switching frequency: | 2 kHz~10 kHz |
| Load current amplitude: | 20 A~100 A |
| Load current angle: | 0°~330° |
| Ambient temperature: | 22° C. |

The maximum temperature increase of the hottest device during testing was approximately 110° C.

Table 5 shows the maximum and minimum temperature prediction errors Max($T_{err}$) and Min($T_{err}$), respectively, for all IGBTs and diodes for each of the four models. In Table 5, $T_{err}$ is defined as the predicted junction minus the tested temperature and is positive when the predicted temperature is higher than the tested result. To increase accuracy of the power losses calculation, the voltage drops of the IGBTs and diodes were calculated in detail by considering the influence of the junction temperature. The resulting temperature errors are shown in Table 5. In addition, the maximum voltage drops were also calculated using a worst case 125° Celsius V/I curve and neglecting the junction temperature influence on the voltage drops. The resulting maximum temperature error values when the 125° Celsius curves were assumed are not shown here but it is noted that the maximum values were almost identical to those shown in table 5 where the junction temperature effect was considered. Thus, it can be concluded that the 125° Celsius curves can be used without appreciably effecting prediction accuracy.

TABLE 5

| $T_{err}$ | $R_{jc}$ model | No neighbor | One neighbor | Two neighbor |
|---|---|---|---|---|
| Max($T_{err}$) | 20.9 | 10.4 | 10.1 | 10.2 |
| Min($T_{err}$) | −32.1 | −18.2 | −8.5 | −7.9 |

From table 5 it can be seen that the $R_{jc}$ model results in a large maximum temperature prediction error (30° C.). Thus, it is not possible to predict the junction temperature accurately by assuming a uniform case temperature and NTC temperature under DC condition.

The "one neighbor model" is the simplest model that yields relatively accurate results and that the "two neighbor model" is not significantly more accurate than the one neighbor model.

There are still around ±10° C. maximum temperature prediction errors after accounting for the thermal interface between neighboring devices. These errors are mostly generated by fluctuations of the voltage forward drop, switching losses, current/voltage measurement, non-ideal geometry of different chips and thermal resistance.

Referring again to Tables 2, 3 and 4, after values required to solve Equations 23 and 24 have been determined via Mathlab or some other similar product, the values can be used in Equations 23 and 24 during normal operation of the associated module 14 (see again FIG. 2) to predict device temperatures.

It should be appreciated that a thermal model has been developed for a six-pack insulated gate bipolar transistor (IGBT) power module operating as a three phase voltage source inverter. With this method, two more thermal layers are added to the system to predict the chip temperatures from the NTC sensor value. The inventive model increases the temperature prediction accuracy when the inverter operates at zero or low output frequency. The model is not complicated and can be easily integrated into a micro-controller programs for dynamic temperature prediction.

One or more specific embodiments of the present invention have been described above. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Thus, the invention is to cover all modifications, equivalents, and alternatives failing within the spirit and scope of the invention as defined by the following appended claims. For example, while useful algorithms are described above wherein the thermal coupling between adjacent and one removed devices is used to predict the junction temperature of a specific device, in some cases other algorithms may be used that account for thermal coupling between other module devices or indeed all module devices mounted to the same sink member.

In addition, while the invention is described above in the context of a six-pak module, it should be appreciated that the invention is useful in the context of other modules such as four-paks, twelve-paks, eighteen paks and so on.

Moreover, while the invention is described above in the context of a module that includes IGBTs, the invention is applicable to other modules that include other device types such as, for instance, MOSFETS, IGCTs, etc.

Furthermore, while the NTC is described above as being located on the module case, in at least some embodiments the NTC may be located elsewhere and still very close to the module and satisfactory results will still occur.

At this point it should be appreciated that the circuits illustrated in FIGS. 3-6 do not represent exact system impedances but rather are predictive in nature. Similarly, the equations based on FIGS. 3-6 and modified above based on various assumptions are not precise and instead are predictive in nature.

To apprise the public of the scope of this invention, the following claims are made:

What is claimed is:

1. A method for predicting junction device temperature of at least a first switching device in a power conversion module that includes a plurality of switching devices, the method comprising the steps of:
providing a processor that runs a program to perform the steps of:
during switching activity, identifying at least one operating characteristic of the first switching device; and
solving an equation that uses the identified operating characteristic to predict the junction device temperature of the first switching device where the equation solved is a function of the distance of the first switching device with respect to the other switching devices in the plurality.

2. The method of claim 1 wherein the operating characteristic is the power loss of the first switching device.

3. The method of claim 2 wherein the equation accounts for power losses of switching devices adjacent the first switching device as well as cross thermal impedance between the adjacent devices and the first switching device and wherein the method further includes the steps of identifying a cross thermal impedance between a switching device adjacent the first switching device and the first switching device and, during switching activity, identifying the power losses of switching devices adjacent the first switching device.

4. The method of claim 3 wherein the switching devices adjacent the first switching device are neighboring devices and wherein the equation accounts for power losses of switching devices adjacent the neighboring devices as well as cross thermal impedance between the devices adjacent the neighboring devices and wherein the method further includes the steps of identifying a cross thermal impedance between a switching device adjacent a neighboring switching device and the first switching device and, during switching activity, identifying the power losses of switching devices adjacent the first switching device.

5. A method for use with a module that includes a plurality of electronic switching devices, the method for predicting the junction temperature of at least a first of the switching devices, the method comprising the steps of:
providing a processor for identifying a power loss value of at least a second of the switching devices;

providing a database in which is stored a cross thermal impedance value indicative of the thermal impedance between the first and second switching devices; and the processor using the power loss value of the at least a second switching device and the cross thermal impedance to predict the temperature of the first switching device junction.

6. The method of claim 5 wherein the database includes cross thermal impedance values for a sub-set of the devices in addition to the second device that are indicative of the thermal impedance between each of the other devices and the first device, the method further including the steps of identifying power loss values for each of the sub-set of devices and using all of the power loss values and the cross thermal impedance values to predict the temperature of the first switching device junction.

7. An apparatus for predicting junction device temperature of at least a first switching device in a power conversion module that includes a plurality of switching devices, the apparatus comprising:

a processor that runs a program to perform the steps of:
during switching activity, identifying at least one operating characteristic of the first switching device; and
solving an equation that uses the identified operating characteristic to predict the junction device temperature of the first switching device where the equation solved is a function of the distance of the first switching device with respect to the other switching devices in the plurality.

8. The apparatus of claim 7 wherein the operating characteristic is the power loss of the first switching device.

9. The apparatus of claim 8 wherein the equation accounts for power losses of switching devices adjacent the first switching device as well as cross thermal impedance between the adjacent devices and the first switching device and wherein the processor further performs the steps of identifying a cross thermal impedance between a switching device adjacent the first switching device and the first switching device and, during switching activity, identifying the power losses of switching devices adjacent the first switching device.

10. The apparatus of claim 9 wherein the switching devices adjacent the first switching device are neighboring devices and wherein the equation accounts for power losses of switching devices adjacent the neighboring devices as well as cross thermal impedance between the devices adjacent the neighboring devices and wherein the processor further performs the steps of identifying a cross thermal impedance between a switching device adjacent a neighboring switching device and the first switching device and, during switching activity, identifying the power losses of switching devices adjacent the first switching device.

11. An apparatus for use with a module that includes a plurality of electronic switching devices, the apparatus for predicting the junction temperature of at least a first of the switching devices, the apparatus comprising:

a database in which is stored a cross thermal impedance value indicative of the thermal impedance between the first and second devices; and
a processor that runs a program to perform the steps of:
identifying power loss of at least a second of the switching devices;
using the power loss value of the at least a second switching device and the cross thermal impedance to predict the temperature of the first switching device junction.

12. The apparatus of claim 11 wherein the database includes cross thermal impedance values for a sub-set of the devices in addition to the second device that are indicative of the thermal impedance between each of the other devices and the first device, the processor further identifying power loss values for each of the sub-set of devices and using all of the power loss values and the cross thermal impedance values to predict the temperature of the first switching device junction.

13. A system comprising:
a power conversion module that includes a plurality of switching devices; and
a processor that runs a program to perform the step of:
predicting a junction temperature of a first of the plurality of switching devices by solving an equation that is a function of the distance of the first switching device with respect to other switching devices of the power conversion module.

14. The system of claim 13 wherein the equation uses an identified operating characteristic of the first switching device to predict the junction temperature.

15. The system of claim 14 wherein the operating characteristic is the power loss of the first switching device.

16. A system comprising:
a power conversion module that includes a plurality of switching devices;
a processor that runs a program to perform the steps of:
predicting a junction temperature of a first of the plurality of switching devices;
identifying a cross thermal impedance between the first switching device and a switching device adjacent the first switching device; and
during switching activity, identifying power losses of other switching devices adjacent the first switching device using an equation that is a function of the distance of the first switching device with respect to the other switching devices.

* * * * *